United States Patent
Fu (10) Patent No.: US 9,596,717 B1
(45) Date of Patent: Mar. 14, 2017

(54) MIFI CONTROL METHOD AND DEVICE

(71) Applicant: Leauto Intelligent Technology (BEIJING) Co., Ltd., Beijing (CN)

(72) Inventor: Yingang Fu, Beijing (CN)

(73) Assignee: Leauto Intelligent Technology (BEIJING) Co., Ltd., Beijing (CN)

( * ) Notice: Subject to any disclaimer, the term of this patent is extended or adjusted under 35 U.S.C. 154(b) by 0 days.

(21) Appl. No.: 14/965,700

(22) Filed: Dec. 10, 2015

(30) Foreign Application Priority Data

Nov. 6, 2015 (CN) .......................... 2015 1 0752706

(51) Int. Cl.
*H04W 88/10* (2009.01)
*H04W 36/14* (2009.01)
*H04W 76/02* (2009.01)
*H04W 76/06* (2009.01)
*H04W 88/04* (2009.01)
H04W 84/04 (2009.01)
H04W 84/12 (2009.01)

(52) U.S. Cl.
CPC .......... *H04W 88/10* (2013.01); *H04W 36/14* (2013.01); *H04W 76/02* (2013.01); *H04W 76/06* (2013.01); *H04W 88/04* (2013.01); H04W 84/042 (2013.01); H04W 84/12 (2013.01)

(58) Field of Classification Search
CPC H04B 1/3816; H04M 2250/14; H04W 88/02; H04W 8/183; H04W 12/06
USPC .......................................................... 455/558
See application file for complete search history.

(56) References Cited

U.S. PATENT DOCUMENTS

2012/0108206 A1* 5/2012 Haggerty .............. H04W 12/06
455/411
2015/0312717 A1* 10/2015 Shih ...................... H04W 8/183
455/456.1

* cited by examiner

*Primary Examiner* — Tuan Pham
(74) *Attorney, Agent, or Firm* — Baker & Hostetler LLP (57) ABSTRACT

The disclosure provides controlling method of MiFi and device thereof. Herein, MiFi is provided with at least two SIM cards of different telecom carriers. The controlling method of MiFi includes: monitoring a currently connected data network corresponding to a SIM card of a source telecom carrier is disconnected; if disconnected, then selecting a SIM card of another telecom carrier except for the SIM card of the source telecom carrier as a SIM card of a target telecom carrier; and connecting to a data network corresponding to the SIM card of the target telecom carrier. In the disclosure, even if MiFi could not continuously access to currently connected data network due to inferior network condition thereof, MiFi still can select and connect to a data network corresponding to a SIM card of another telecom carrier, whereby solving problems that MiFi may be restricted by network condition of telecom carrier to which the inserted SIM card belongs in the prior art and improving user's experience.

8 Claims, 4 Drawing Sheets

MIFI CONTROL METHOD AND DEVICE

CROSS-REFERENCE TO RELATED APPLICATIONS

This present disclosure is based upon and claims priority to Chinese Patent Application No. CN201510752706.8, filed Nov. 6, 2015, the entire contents of all of which are incorporated herein by reference.

FIELD OF TECHNOLOGY

The present disclosure relates to the field of network communication technology, and more particularly, to a controlling method of MiFi and device thereof.

BACKGROUND

With the rapid development of network technique, dependence of a user on the network is expanding. Regardless of work, study or entertainment, network has become an inseparable part. In recent years, the demand of the user for network convenience is getting higher. Especially in some occasions in lack of network interfaces, network connection sharing becomes more crucial. Therefore, for the convenience of the user to a greater degree, MiFi (portable broadband wireless device) appears accordingly. The MiFi is a kind of portable broadband wireless device combining functions of modem, router and access point in one, wherein built-in modem can access to a wireless signal and the inner router can share the connection between users and the wireless device. For this reason, the MiFi is sometimes known as a personal "hotspot".

For an existing MiFi, by inserting a SIM (Subscriber Identity Module) card in the MiFi, network side may access to Internet via data network, while user side may provide a hotspot to access to Internet for other WiFi terminal devices via WiFi (Wireless-Fidelity) network.

However, the existing MiFi may be restricted by network condition of a telecom carrier to which the inserted SIM card belongs. When the network condition of the telecom carrier is inferior, the MiFi could not continuously access to the network, resulting in that it could not continuously provide data access service for other WiFi terminal devices.

SUMMARY

The embodiments of the disclosure provide controlling method of MiFi and device thereof for solving problems that the MiFi may be restricted by the network condition of the telecom carrier to which the inserted SIM card belongs in the prior art.

The embodiment of the disclosure provides a controlling method of MiFi. MiFi is provided with at least two SIM cards of different telecom carriers. The method includes:
monitoring a currently connected data network corresponding to a SIM card of a source telecom carrier is disconnected;
if disconnected, then selecting a SIM card of another telecom carrier except for the SIM card of the source telecom carrier as a SIM card of a target telecom carrier; and
connecting to a data network corresponding to the SIM card of the target telecom carrier.

The embodiment of the disclosure provides a controlling device of MiFi. MiFi is provided with at least two SIM cards of different telecom carriers. The device includes:
a monitoring module, configured to monitor a currently connected data network corresponding to a SIM card of a source telecom carrier is disconnected;
a selecting module, configured to, when "disconnection" is monitored by the monitoring module, select a SIM card of another telecom carrier except for the SIM card of the source telecom carrier as a SIM card of a target telecom carrier; and
a connecting module, configured to connect to a data network corresponding to the SIM card of the target telecom carrier.

The embodiment of the disclosure provides a controlling device of MiFi, wherein, MiFi is provided with at least two SIM cards of different telecom carriers and the device includes:
at least one processor;
a memory for storing at least one instruction executable by the processor;
wherein the processor is configured to:
monitor a currently connected data network corresponding to a SIM card of a source telecom carrier is disconnected;
when "disconnection" is monitored by the monitoring module, select a SIM card of another telecom carrier except for the SIM card of the source telecom carrier as a SIM card of a target telecom carrier; and
connect to a data network corresponding to the SIM card of the target telecom carrier.

In the controlling method of MiFi and device thereof according to the embodiments of the disclosure, MiFi is provided with at least two SIM cards of different telecom carriers. When MiFi has been connected to a data network corresponding to a SIM card of a source telecom carrier, it may be possible to monitor whether the currently connected data network corresponding to the SIM card of the source telecom carrier is disconnected. If disconnected, it is possible to select a SIM card of another telecom carrier except for the SIM card of the source telecom carrier as a SIM card of a target telecom carrier and connect to a data network corresponding to the SIM card of the target telecom carrier. Therefore, in the embodiments of the disclosure, even if MiFi could not continuously access to the currently connected data network due to the inferior network condition of the data network, MiFi is still able to select and connect to a data network corresponding to a SIM card of another telecom carrier, whereby solving problems that MiFi may be restricted by the network condition of the telecom carrier to which the inserted SIM card belongs in the prior art and improving user's experience.

BRIEF DESCRIPTION OF THE DRAWINGS

In order to more apparently describe the technical schemes in the embodiments of the disclosure or in the prior art, accompanying figures necessarily used in the description of the embodiments or the prior art will be simply explained hereinafter. Obviously, the accompanying figures described below will form the embodiments of the disclosure. An ordinary person skilled in the art may conceive further figures in accordance with these accompanying figures without contributing creative labor.

DESCRIPTION OF THE EMBODIMENTS

In order that objectives, technical schemes and advantages of the embodiments of the disclosure become more apparent, the technical schemes in the embodiments of the disclosure will be thoroughly and completely described below in conjunction with the accompanying figures in the embodiments of the disclosure. It is obvious that the embodiments described herein are some of embodiments of the disclosure rather than entire embodiments. On the basis of the embodiments of the disclosure, other embodiments conceived by an ordinary person skilled in the art without creative labor would all fall into the protection scope of the disclosure.

First Embodiment

Figure 1:
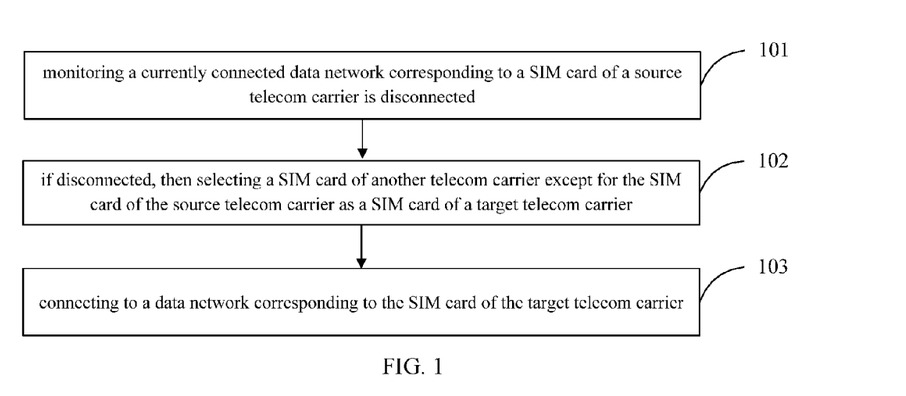
FIG. 1 is a flow chart of a controlling method of MiFi according to a first embodiment of the disclosure.

With reference to FIG. 1, it shows a flow chart of a controlling method of MiFi according to a first embodiment of the disclosure.

The controlling method of MiFi according to the embodiment of the disclosure may include steps of:

Step 101, monitoring a currently connected data network corresponding to a SIM card of a source telecom carrier is disconnected.

The MiFi according to the embodiment of the disclosure is provided with at least two SIM cards of different telecom carriers. Each SIM card corresponds to a type of data network. Initially, the MiFi may be connected to the data network corresponding to one of SIM cards which is used as the SIM card of the source telecom carrier. Herein, the initially connected data network can be such a data network corresponding to a SIM card manually selected by a user or a data network corresponding to a SIM card having stronger signal that is automatically selected by the MiFi according to network signal strength, which should not be restricted by the embodiment of the disclosure.

After the MiFi is connected to the data network corresponding to the SIM card of the source telecom carrier, it is possible to monitor the currently connected data network corresponding to the SIM card of the source telecom carrier is disconnected, in order to determine whether there is a need to connect a data network corresponding to a SIM card of another telecom carrier. Herein, "monitor" could be "real-time monitor" or "monitor by a defined time interval". For the time interval, any suitable value (for example, 3 s or 5 s) may be set by those skilled in the art according to their experience. The specific numerical value should not be restricted by the embodiment of the disclosure.

Step 102, if disconnected, then selecting a SIM card of another telecom carrier except for the SIM card of the source telecom carrier as a SIM card of a target telecom carrier.

If it is monitored that the currently connected data network corresponding to the SIM card of the source telecom carrier is disconnected at Step 101, since the MiFi is provided with at least two SIM cards of different telecom carriers, the embodiment of the disclosure could select one of SIM cards of other telecom carriers except for the SIM card of the source telecom carrier as a SIM card of a target telecom carrier, in order to prevent that the MiFi could not continuously access to the disconnected network so that it could not continuously provide data access service for other WiFi terminal devices, and then the MiFi could be connected to a data network corresponding to the SIM card of the target telecom carrier, whereby ensuring that it is still able to access to data network.

Step 103, connecting to a data network corresponding to the SIM card of the target telecom carrier.

In the controlling method of MiFi according to the embodiment of the disclosure, MiFi is provided with at least two SIM cards of different telecom carriers. When MiFi has been connected to a data network corresponding to a SIM card of a source telecom carrier, it may be possible to monitor whether the currently connected data network corresponding to the SIM card of the source telecom carrier is disconnected. If disconnected, it is possible to select a SIM card of another telecom carrier except for the SIM card of the source telecom carrier as a SIM card of a target telecom carrier and connect to a data network corresponding to the SIM card of the target telecom carrier. Therefore, in the embodiment of the disclosure, even if MiFi could not continuously access to the currently connected data network due to the inferior network condition of the data network, MiFi is still able to select and connect to a data network corresponding to a SIM card of another telecom carrier, whereby solving problems that MiFi may be restricted by the network condition of the telecom carrier to which the inserted SIM card belongs in the prior art and improving user's experience.

Second Embodiment

Figure 2:
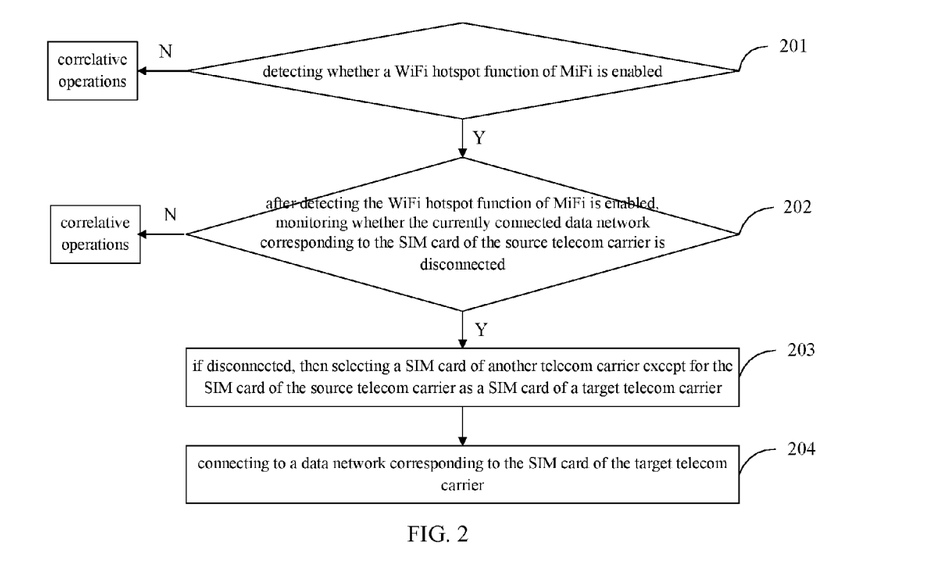
FIG. 2 is a flow chart of a controlling method of MiFi according to a second embodiment of the disclosure.

With reference to FIG. 2, it shows a flow chart of a controlling method of MiFi according to a second embodiment of the disclosure.

The controlling method of MiFi according to the embodiment of the disclosure may include steps of:

Step 201, detecting whether a WiFi hotspot function of MiFi is enabled, if enabled, then executing Step 202; otherwise, executing correlative operations.

Figure 3:
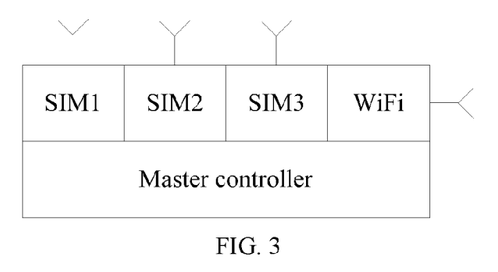
FIG. 3 is a schematic structural diagram of the MiFi according to the second embodiment of the disclosure.

In the embodiment of the disclosure, the MiFi is provided with at least two SIM cards of different telecom carriers. With reference to FIG. 3, it shows a schematic structural diagram of the MiFi according to the second embodiment of the disclosure. The MiFi includes three SIM cards which are SIM1, SIM2 and SIM3, and further includes a master controller and a WiFi module. SIM1, SIM2, SIM3 and WiFi module have respective network signals. Herein, the three SIM cards belong to different telecom carriers (for example, SIM1 belongs to China Mobile, SIM2 belongs to China Unicom, SIM3 belongs to China Telecom), respectively. The master controller is substantially used to control network connections of the MiFi on network side and WiFi terminal devices connected to the MiFi on user side. The WiFi module is a module for completing the WiFi hotspot function of MiFi. The WiFi module can be enabled and disabled (corresponding to enablement and disablement of the WiFi hotspot function, respectively). It should be explained that the MiFi as shown in FIG. 3 are provided merely for illustrative purpose, and the MiFi in the embodiment of the disclosure should not be limited to including three SIM cards of SIM1, SIM2 and SIM3 as shown in FIG. 3 and could simply include any two of the SIM cards, which should not be restricted by the embodiment of the disclosure.

When the WiFi hotspot function of MiFi is enabled, via the WiFi hotspot of the MiFi, other WiFi terminal devices are allowed to access to the data network to which the MiFi is currently connected; when the WiFi hotspot function of MiFi is disabled, other WiFi terminal devices are not allowed to access to the data network to which the MiFi is currently connected, via the WiFi hotspot of the MiFi. Preferably, in the embodiment of the disclosure, it is possible to detect whether the WiFi hotspot function of MiFi is enabled, and in turn to determine whether to monitor connection status of the data network to which the MiFi is currently connected and corresponding to the SIM card of the source telecom carrier.

Herein, the process of detecting whether the WiFi hotspot function of MiFi is enabled could include: detecting whether the WiFi module of MiFi is enabled, wherein if yes, it could be proved the WiFi hotspot function of MiFi is enabled. In a specific implementation, ON/OFF option of the WiFi module can be set in the MiFi. For example, ON/OFF button can be defined. When ON option is selected, the MiFi can receive an instruction for enabling the WiFi module and the WiFi module can be enabled immediately upon the receipt of the instruction; When OFF option is selected, the MiFi can receive an instruction for disabling the WiFi module and the WiFi module can be disabled immediately upon the receipt of the instruction.

Step 202, after detecting the WiFi hotspot function of MiFi is enabled, monitoring whether the currently connected data network corresponding to the SIM card of the source telecom carrier is disconnected, if disconnected, then executing Step 203; otherwise, executing correlative operations.

Considering that other WiFi terminal devices are allowed to access to the currently connected data network of MiFi via the WiFi hotspot of MiFi only after the WiFi hotspot function of MiFi is enabled, if the data network connection of MiFi is disconnected in this case, then other WiFi terminal devices could not continuously connect to the network via the MiFi; if the WiFi hotspot function of MiFi is disabled, no matter data network connection of MiFi is disconnected in this case, other WiFi terminal devices would not be allowed to access to the currently connected data network of MiFi via the WiFi hotspot of MiFi. Therefore, there is no need to monitor the network connections of MiFi in practice. Preferably, therefore, it may be further defined, only after detecting the WiFi hotspot function of MiFi is enabled, the embodiment of the disclosure can monitor whether the currently connected data network corresponding to the SIM card of the source telecom carrier is disconnected; if it is detected the WiFi hotspot function of MiFi is not enabled, then correlative operations would be executed. The correlative operations may include: continuously and repeatedly executing the process of detecting whether the WiFi hotspot function of MiFi in enabled. By above manners, power consumption of MiFi can be further lowered and electrical supply can be saved.

In the embodiment of the disclosure, a routing table is stored in the MiFi. Network connection information of MiFi can be recorded in the routing table. Taking the MiFi as shown in FIG. 3 as an example, the routing table may keep information such as respective names of network port, statuses of network port and titles of telecom carrier corresponding to three SIM cards of SIM1, SIM2 and SIM3. Herein, the statuses of network port include "connection" and "disconnection". For example, if the MiFi is currently connected to the data network corresponding to SIM1 card, the statuses of network port recorded in the routing table would be: SIM1 is in connection, while SIM2 and SIM3 are in disconnection. If the data network corresponding to SIM1 card is disconnected subsequently, then the statuses of network port recorded in the routing table would be automatically updated as follows: SIM1, SIM2 and SIM3 are all in disconnection. Therefore, it is possible to monitor whether the currently connected data network corresponding to the SIM card of source telecom carrier is disconnected by monitoring the routing table. Therefore, Step 202 may include: monitoring whether status of network port corresponding to the SIM card of the source telecom carrier recorded in a routing table stored inside MiFi is switched from "connection" to "disconnection"; and if yes, then determining the currently connected data network corresponding to the SIM card of source telecom carrier is disconnected.

Step 203, if disconnected, then selecting a SIM card of another telecom carrier except for the SIM card of the source telecom carrier as a SIM card of a target telecom carrier.

If it is monitored that the currently connected data network corresponding to the SIM card of the source telecom carrier is disconnected at Step 202, in order to prevent that other WiFi terminal device could not continuously access to the data network due to the disconnection of the data network connections of MiFi, the MiFi according to the embodiment of the disclosure could automatically select a SIM card of another telecom carrier as a SIM card of a target telecom carrier and connect to the data network based on the SIM card of the target telecom carrier. If it is monitored that the currently connected data network corresponding to the SIM card of the source telecom carrier is connected, then correlative operations would be executed. The correlative operations may include: continuously and repeatedly executing the process of monitoring whether the currently connected data network corresponding to the SIM card of the source telecom carrier is disconnected.

Preferably, the embodiment of the disclosure may execute the selecting process at Step 203 according to the actual number of the SIM cards inserted into the MiFi. In particular, there are included following two situations. In the first situation, if the MiFi is provided with two SIM cards of different telecom carriers, then the SIM card of the other telecom carrier except for the SIM card of the source telecom carrier may be selected as the SIM card of the target telecom carrier. In the second situation, if the MiFi is provided with at least three SIM cards of different telecom carriers, then a SIM card of a telecom carrier having the strongest network signal strength may be selected from SIM cards of other telecom carriers except for the SIM card of the source telecom carrier as the SIM card of the target telecom carrier. Taking the MiFi provided with three SIM cards as shown in FIG. 3 as an example, if the SIM card of the source telecom carrier is SIM1, then when the network connection of SIM1 is disconnected, the MiFi will select a SIM card having stronger network signal strength from SIM2 and SIM3 as a SIM card of target telecom carrier. It is should be explained, the process of judging the respective network signal strengths of SIM cards of other telecom carriers can be performed in any suitable manners by those skilled in the art according to their experience, and thus detailed description thereof will be omitted in the embodiment of the disclosure.

Step 204, connecting to a data network corresponding to the SIM card of the target telecom carrier.

After the SIM card of the target telecom carrier is selected at Step 204, the MiFi may be automatically connected to the data network corresponding to the SIM card of the target telecom carrier. With the connection, the MiFi may continuously access to the data network corresponding to the SIM card of the target telecom carrier, and in turn provide data access service for other WiFi terminal devices. Preferably, Step 204 may include: obtaining name of network port corresponding to the SIM card of the target telecom carrier; updating status of network port corresponding to the name of network port recorded in the routing table stored inside the MiFi into "connection" from "disconnection".

Taking the MiFi as shown in FIG. 3 as an example, if the SIM card of the source telecom carrier is SIM1, then when the network connection of SIM1 is disconnected, the MiFi will select a SIM card having stronger network signal strength from SIM2 and SIM3 as a SIM card of target telecom carrier. If SIM2 is selected as the SIM card of the target telecom carrier, with the selection, the MiFi will be connected to the data network corresponding to SIM2. In particular, it is possible to obtain the name of network port corresponding to SIM2, and then to update the network port corresponding to the name from "disconnection" into "connection". Therefore, the status of network port recorded in the updated routing table would be: SIM1 is in disconnection, SIM2 is in connection and SIM3 is in disconnection.

In the end, it should be explained, Step 201-Step 204 as described above could be steps executed by the master controller in the MiFi as shown in FIG. 3.

Compared with traditional MiFi solutions, the embodiments of the disclosure can well overcome shortages of the MiFi solutions with a single SIM card inserted. For example, if three SIM cards (a Unicom card+a Mobile card+a Telecom card) are inserted, advantages of the inventive scheme can be exerted to a greater degree. When a user arrives at somewhere along with the MiFi, in case that Unicom has no service, Mobile network may be used; furthermore, in case that Mobile has no service, Telecom network may also be used. Thereby, it is possible to provide a great convenience for the users and improve user's experience.

Third Embodiment

Figure 4:
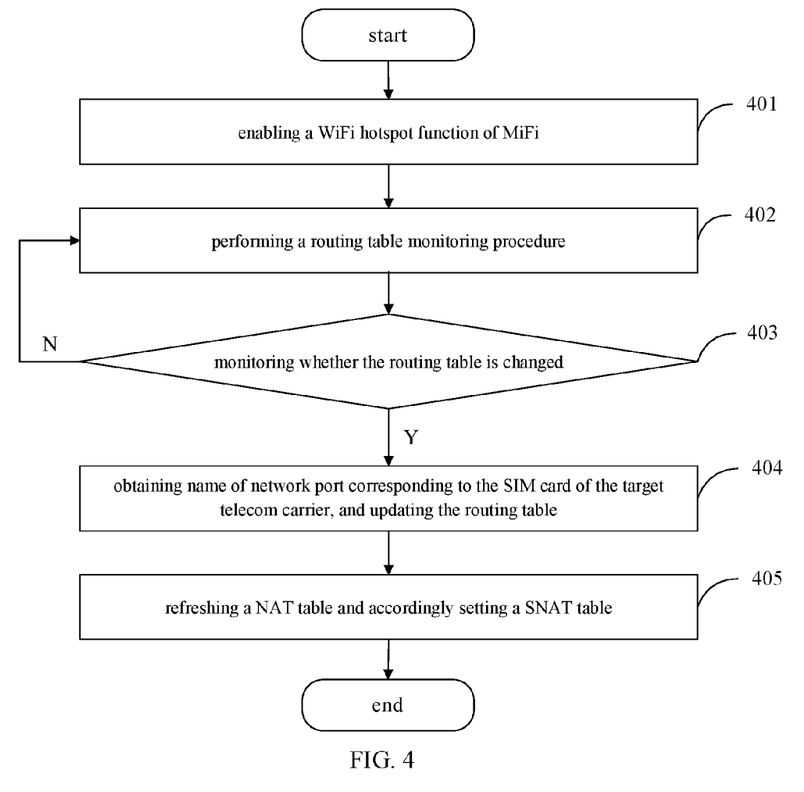
FIG. 4 is a flow chart of a controlling method of MiFi according to a third embodiment of the disclosure.

With reference to FIG. 4, it shows a flow chart of a controlling method of MiFi according to a third embodiment of the disclosure.

The controlling method of MiFi according to the embodiment of the disclosure may include steps of:

Step 401, enabling a WiFi hotspot function of MiFi.

As for Step 201 in the second embodiment, ON/OFF option of the WiFi module can be set in the MiFi. For example, ON/OFF button can be defined. When ON option is selected, the MiFi can receive an instruction for enabling the WiFi module. Upon the receipt of the instruction, the WiFi module can be enabled immediately and in turn the WiFi hotspot function of MiFi can be enabled.

Step 402, performing a routing table monitoring procedure.

In the embodiment of the disclosure, it is possible to predefine a routing table monitoring procedure which is mainly used to monitor change situation of the routing table.

Step 403, monitoring whether the routing table is changed, if yes, then executing Step 404; otherwise, returning to Step 402.

This step may correspond to Step 202 in the second embodiment and be regarded as a specific implementation of Step 202. Therefore, this step of monitoring whether the routing table is changed may particularly relate to: monitoring whether status of network port corresponding to the SIM card of the source telecom carrier recorded in the routing table stored inside the MiFi is switched from "connection" to "disconnection".

Step 404, obtaining name of network port corresponding to the SIM card of the target telecom carrier, and updating the routing table.

This step may correspond to Step 203 and Step 204 in the second embodiment and relevant description thereof may refer to Step 203 and Step 204 for detail.

Step 405, refreshing a NAT table and accordingly setting a SNAT table.

In the embodiment of the disclosure, a NAT (Network Address Translation) table and a SNAT (Source Network Address Translation) table can be further stored in the MiFi, wherein the NAT table may keep MiFi outward network information (such as, current outward network addresses and outward network interface names) and the SNAT may keep MiFi outward network information and source network information.

After updating the routing table, it is also possible to refresh the NAT table and accordingly set the SNAT table. There is included: setting the outward network information stored in the NAT table and the SNAT table to network information corresponding to the SIM card of the target telecom carrier. Taking the MiFi as shown in FIG. 3 as an example, if the SIM card of the source telecom carrier is SIM1, then when the network connection of SIM1 is disconnected, the MiFi will select SIM2 as the SIM card of the target telecom carrier. Then the step of refreshing NAT table and accordingly setting SNAT table may include: setting the outward network information (i.e., network information corresponding to SIM1) stored in the NAT table and SNAT table to network information corresponding to SIM2. For example, the outward network address may be set to the network address corresponding to SIM2, and the outward network interface name may be set to network interface name corresponding to SIM2.

The method embodiments as described above, for the purpose of brief description, are described as a series of combined actions. However, it should be appreciated by those skilled in the art that the embodiments of the disclosure should not be restricted by the sequence of the actions as set forth, since some of actions could be performed in different sequence or simultaneously. Moreover, it should also be appreciated by those skilled in the art that, the embodiments as described in the specification are preferred embodiments and actions and modules concerned are not necessarily required in the disclosure.

Fourth Embodiment

Figure 5:
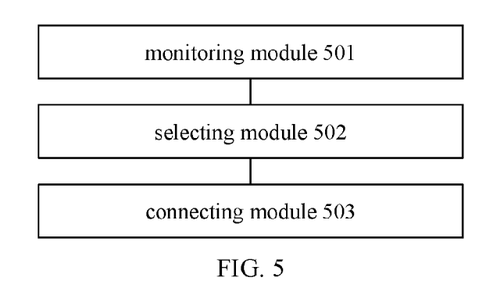
FIG. 5 is a block diagram of a controlling device of MiFi according to a fourth embodiment of the disclosure.

With reference to FIG. 5, it shows a block diagram of a controlling device of MiFi according to a fourth embodiment of the disclosure. The MiFi according to the embodiment of the disclosure is provided with at least two SIM cards of different telecom carriers.

The controlling device of MiFi according to the embodiment of the disclosure may include following modules:

a monitoring module 501, configured to monitor a currently connected data network corresponding to a SIM card of a source telecom carrier is disconnected;

a selecting module 502, configured to, when "disconnection" is monitored by the monitoring module, select a SIM card of another telecom carrier except for the SIM card of the source telecom carrier as a SIM card of a target telecom carrier; and a connecting module 503, configured to connect to a data network corresponding to the SIM card of the target telecom carrier.

In the controlling device of MiFi according to the embodiment of the disclosure, the MiFi is provided with at least two SIM cards of different telecom carriers. When MiFi has been connected to a data network corresponding to a SIM card of a source telecom carrier, it may be possible to monitor whether the currently connected data network corresponding to the SIM card of the source telecom carrier is disconnected. If disconnected, it is possible to select a SIM card of another telecom carrier except for the SIM card of the source telecom carrier as a SIM card of a target telecom carrier and connect to a data network corresponding to the SIM card of the target telecom carrier. Therefore, in the embodiment of the disclosure, even if the MiFi could not continuously access to the currently connected data network due to the inferior network condition of the data network, MiFi is still able to select and connect to a data network corresponding to a SIM card of another telecom carrier, whereby solving problems that the MiFi may be restricted by the network condition of the telecom carrier to which the inserted SIM card belongs in the prior art and improving user's experience.

Fifth Embodiment

Figure 6:
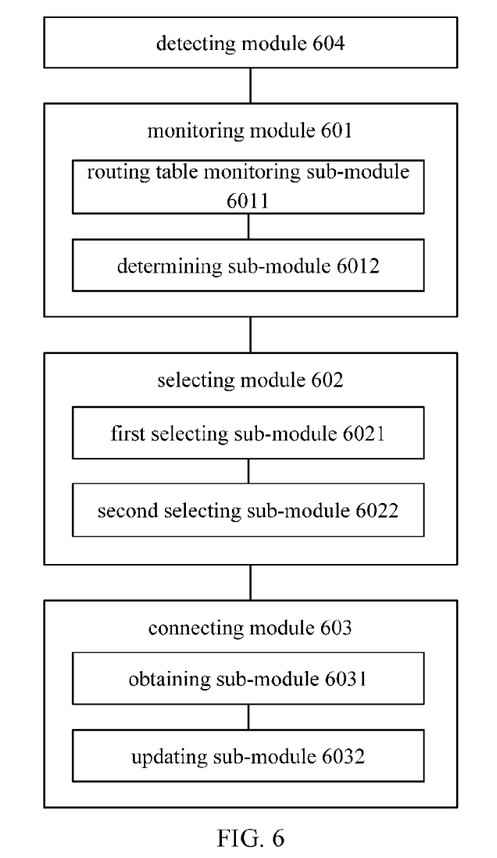
FIG. 6 is a block diagram of a controlling device of MiFi according to a fifth embodiment of the disclosure.

With reference to FIG. 6, it shows a block diagram of a controlling device of MiFi according to a fifth embodiment of the disclosure. The MiFi according to the embodiment of the disclosure is provided with at least two SIM cards of different telecom carriers.

The controlling device of MiFi according to the embodiment of the disclosure may include following modules:

a monitoring module 601, configured to monitor a currently connected data network corresponding to a SIM card of a source telecom carrier is disconnected;

a selecting module 602, configured to, if "disconnection" is monitored by the monitoring module, select a SIM card of another telecom carrier except for the SIM card of the source telecom carrier as a SIM card of a target telecom carrier; and a connecting module 603, configured to connect to a data network corresponding to the SIM card of the target telecom carrier.

Preferably, the controlling device of MiFi may further include: a detecting module 604, configured to, before the monitoring module monitors whether the currently connected data network corresponding to the SIM card of the source telecom carrier is disconnected, detect whether a WiFi hotspot function of MiFi is enabled. Accordingly, the monitoring module is particularly configured to, after the detecting module detects the WiFi hotspot function of MiFi is enabled, monitor whether the currently connected data network corresponding to the SIM card of the source telecom carrier is disconnected.

Preferably, the monitoring module 601 may include:

a routing table monitoring sub-module 6011, configured to monitor whether status of network port corresponding to the SIM card of the source telecom carrier recorded in the routing table stored inside MiFi is switched from "connection" to "disconnection"; and a determining sub-module 6012, configured to, when a monitoring result of the routing table monitoring sub-module is yes, determine the currently connected data network corresponding to the SIM card of source telecom carrier is disconnected.

Preferably, the selecting module 602 may further include:

a first selecting sub-module 6021, configured to, when MiFi is provided with two SIM cards of different telecom carriers, select a SIM card of the other telecom carrier except for the SIM card of the source telecom carrier as a SIM card of a target telecom carrier; and a second selecting sub-module 6022, configured to, when MiFi is provided with at least three SIM cards of different telecom carriers, select a SIM card of a telecom carrier having the strongest network signal strength from SIM cards of other telecom carriers except for the SIM card of the source telecom carrier as a SIM card of target telecom carrier.

Preferably, the connecting module 603 may include:

an obtaining sub-module 6031, configured to obtain name of network port corresponding to the SIM card of the target telecom carrier; and an updating sub-module 6032, configured to update status of network port corresponding to the name of network port recorded in the routing table stored inside MiFi into "connection" from "disconnection".

Compared with traditional MiFi solutions, the embodiments of the disclosure can well overcome shortages of the MiFi solutions with a single SIM card inserted. For example, if three SIM cards (a Unicom card+a Mobile card+a Telecom card) are inserted, advantages of the inventive scheme can be exerted to a greater degree. When a user arrives at somewhere along with the MiFi, in case that Unicom has no service, Mobile network may be used; furthermore, in case that Mobile has no service, Telecom network may also be used. Thereby, it is possible to provide a great convenience for the users and improve user's experience.

Since the device embodiments are substantially similar to the method embodiments as described, the description thereof is relatively simple. For the device embodiments, reference can be made to related parts of the method embodiments.

Each member embodiment of the present disclosure can be realized by hardware, or realized by software modules running on one or more processors, or realized by the combination thereof. A person skilled in the art should understand that a microprocessor or a digital signal processor (DSP) may be used in practical use to realize some or all the functions of some or all the members of the controlling device of MiFi according to the embodiments of the present disclosure. The present disclosure may be further realized as some or all the equipment or device programs for executing the methods described herein (for example, computer programs and computer program products). This program for realizing the present disclosure may be stored in computer readable medium, or have one or more signal forms. These signals may be downloaded from the Internet website, or be provided by carrying signals, or be provided in any other manners.

Figure 7:
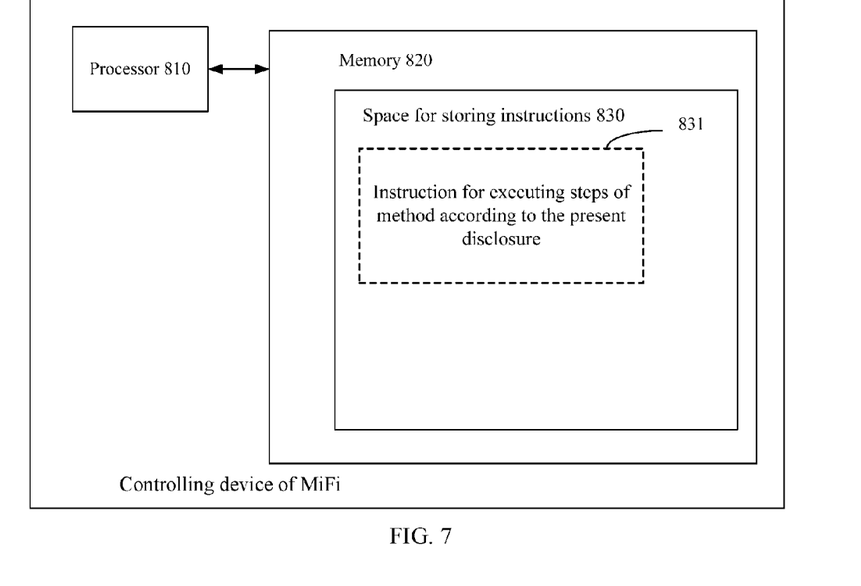
FIG. 7 is a block diagram schematically showing the controlling device of MiFi according to the present disclosure.
Figure 8:
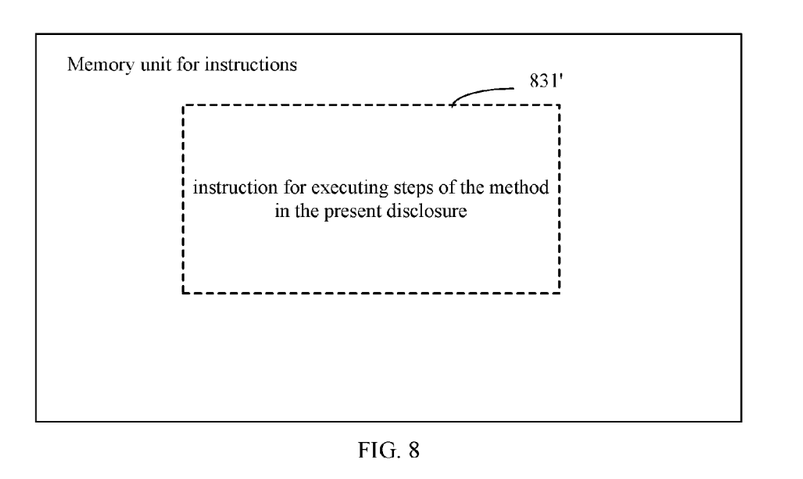
FIG. 8 is a schematic diagram showing a memory for saving or carrying instructions according to the present disclosure.

For example, FIG. 7 is a block diagram schematically showing a controlling device of MiFi for executing the methods of the present disclosure. The device conventionally includes a processor 810 and a computer program product or computer readable medium in the form of memory 820. The memory 820 may be an electronic memory such as a flash memory, EEPRPOM (electrically erasable programmable read-only memory), EPROM (electrically programmable read-only memory), hard disk or ROM (read-only memory). The memory 820 has a memory space 830 for storing instructions for executing any of the steps in the above method. For example, the memory space 830 for storing the instructions may include each instruction 831 for realizing steps in the above methods respectively. The instruction may be read out from one or more computer program product or write in one or more computer program product. The computer program product includes instruction carrier such as hard disk, compact disk (CD), storage card, or soft disk. The computer program product is usually a portable or non-portable memory unit shown in FIG. 8. The memory unit may have similar-arranged memory paragraph, memory space and the like as the memory 820 of the controlling device of MiFi in FIG. 7. The instructions may be, for example, compacted in appropriate form. Generally, the memory unit includes a computer readable code 831', that is, the code which may be read by processor such as the processor 810. When the instruction is executed by the controlling device of MiFi, the controlling device of MiFi is made to execute the steps in the methods above.

The above embodiments are described merely for a schematic purpose, wherein the units explained as individual members may or may not be physically separated, the members shown as units may or may not be physical units and they can be placed at a position or also can be distributed to network units. As necessary in practice, some or all of the modules can be selected to complete the objectives of the schemes of the embodiments. An ordinary person skilled in the art may understand and implement the embodiments without contributing creative labor.

Through above description of the implementations, it is obvious for the skilled in the art that the implementations can be completed by means of software in connection with necessary universal hardware platform or of course by means of hardware. Based on this understanding, the essence of aforesaid technical schemes or the part contributing to the prior art can be embodied in a form of software product. The computer software product can be stored in computer readable storage medium, such as ROM/RAM, magnetic disc, compact disc and the like, which contains a plurality of instructions such that a computing device (such as, personal computer, server or network apparatus) is able to execute the methods as described in the embodiments or a portion of the embodiment.

In the end, it should be explained that aforesaid embodiments are provided for the purpose of illustrating not limiting the technical schemes of the present disclosure. Although the present disclosure has been described in detail with reference to the embodiments, it should be understood that modifications or equivalent substitutions can be made to the technical schemes or some of technical features therein as disclosed in the embodiments by those skilled in the art; the modifications or substitutions will not bring the essence of the respective technical schemes to depart from spirit and scope of the technical schemes of the inventive embodiments.

What is claimed is:

1. A method of controlling MiFi, wherein MiFi is provided with at least two SIM cards of different telecom carriers and the method comprises:
   monitoring a currently connected data network corresponding to a SIM card of a source telecom carrier is disconnected;
   if disconnected, selecting a SIM card of another telecom carrier except for the SIM card of the source telecom carrier as a SIM card of a target telecom carrier;
   connecting to a data network corresponding to the SIM card of the target telecom carrier, wherein the connecting to a data network corresponding to the SIM card of the target telecom carrier comprises:
   obtaining name of network port corresponding to the SIM card of the target telecom carrier, and
   updating status of network port corresponding to the name of network port recorded in a routing table stored inside MiFi into "connection" from "disconnection".

2. The method according to claim 1, wherein prior to the monitoring a currently connected data network corresponding to a SIM card of a source telecom carrier is disconnected, the method further comprises:
   detecting whether a WiFi hotspot function of MiFi is enabled, and
   the monitoring a currently connected data network corresponding to a SIM card of a source telecom carrier is disconnected comprises:
   after the detecting the WiFi hotspot function of MiFi is enabled, monitoring the currently connected data network corresponding to the SIM card of the source telecom carrier is disconnected.

3. The method according to claim 1, wherein the monitoring a currently connected data network corresponding to a SIM card of a source telecom carrier is disconnected comprises:
   monitoring whether status of network port corresponding to the SIM card of the source telecom carrier recorded in a routing table stored inside MiFi is switched from "connection" to "disconnection"; and
   if yes, then determining the currently connected data network corresponding to the SIM card of source telecom carrier is disconnected.

4. The method according to claim 1, wherein the selecting a SIM card of another telecom carrier except for the SIM card of the source telecom carrier as a SIM card of a target telecom carrier comprises:
   if MiFi is provided with two SIM cards of different telecom carriers, then selecting a SIM card of the other telecom carrier except for the SIM card of the source telecom carrier as a SIM card of a target telecom carrier; and
   if MiFi is provided with at least three SIM cards of different telecom carriers, then selecting a SIM card of a telecom carrier having the strongest network signal strength from SIM cards of other telecom carriers except for the SIM card of the source telecom carrier as a SIM card of target telecom carrier.

5. A device of controlling MiFi, wherein MiFi is provided with at least two SIM cards of different telecom carriers and the device comprises:
   at least one processor;
   a memory for storing at least one instruction executable by the at least one processor;
   wherein the at least one processor is configured to:
   monitor a currently connected data network corresponding to a SIM card of a source telecom carrier is disconnected,
   when "disconnection" is monitored, select a SIM card of another telecom carrier except for the SIM card of the source telecom carrier as a SIM card of a target telecom carrier,
   connect to a data network corresponding to the SIM card of the target telecom carrier,
   obtain name of network port corresponding to the SIM card of the target telecom carrier, and update status of network port corresponding to the name of network port recorded in the routing table stored inside MiFi into "connection" from "disconnection".

6. The device according to claim 5, wherein the at least one processor is configured to:
   before monitoring whether the currently connected data network corresponding to the SIM card of the source telecom carrier is disconnected, detect whether a WiFi hotspot function of MiFi is enabled, and
   after detecting the WiFi hotspot function of MiFi is enabled, monitor whether the currently connected data network corresponding to the SIM card of the source telecom carrier is disconnected.

7. The device according to claim 5, wherein the at least one processor is configured to:
   monitor whether status of network port corresponding to the SIM card of the source telecom carrier recorded in the routing table stored inside MiFi is switched from "connection" to "disconnection"; and
   when a monitoring result is yes, determine the currently connected data network corresponding to the SIM card of source telecom carrier is disconnected.

8. The device according to claim 5, wherein the at least one processor is configured to:
   when MiFi is provided with two SIM cards of different telecom carriers, select a SIM card of the other telecom carrier except for the SIM card of the source telecom carrier as a SIM card of a target telecom carrier; and
   when MiFi is provided with at least three SIM cards of different telecom carriers, select a SIM card of a telecom carrier having the strongest network signal strength from SIM cards of other telecom carriers except for the SIM card of the source telecom carrier as a SIM card of target telecom carrier.

* * * * *